Feb. 12, 1929.
D. J. SHELTON ET AL
1,701,594
STEERING MECHANISM FOR POWER SHOVELS OF THE TRACTION BELT TYPE
Filed Aug. 5, 1926  5 Sheets-Sheet 3
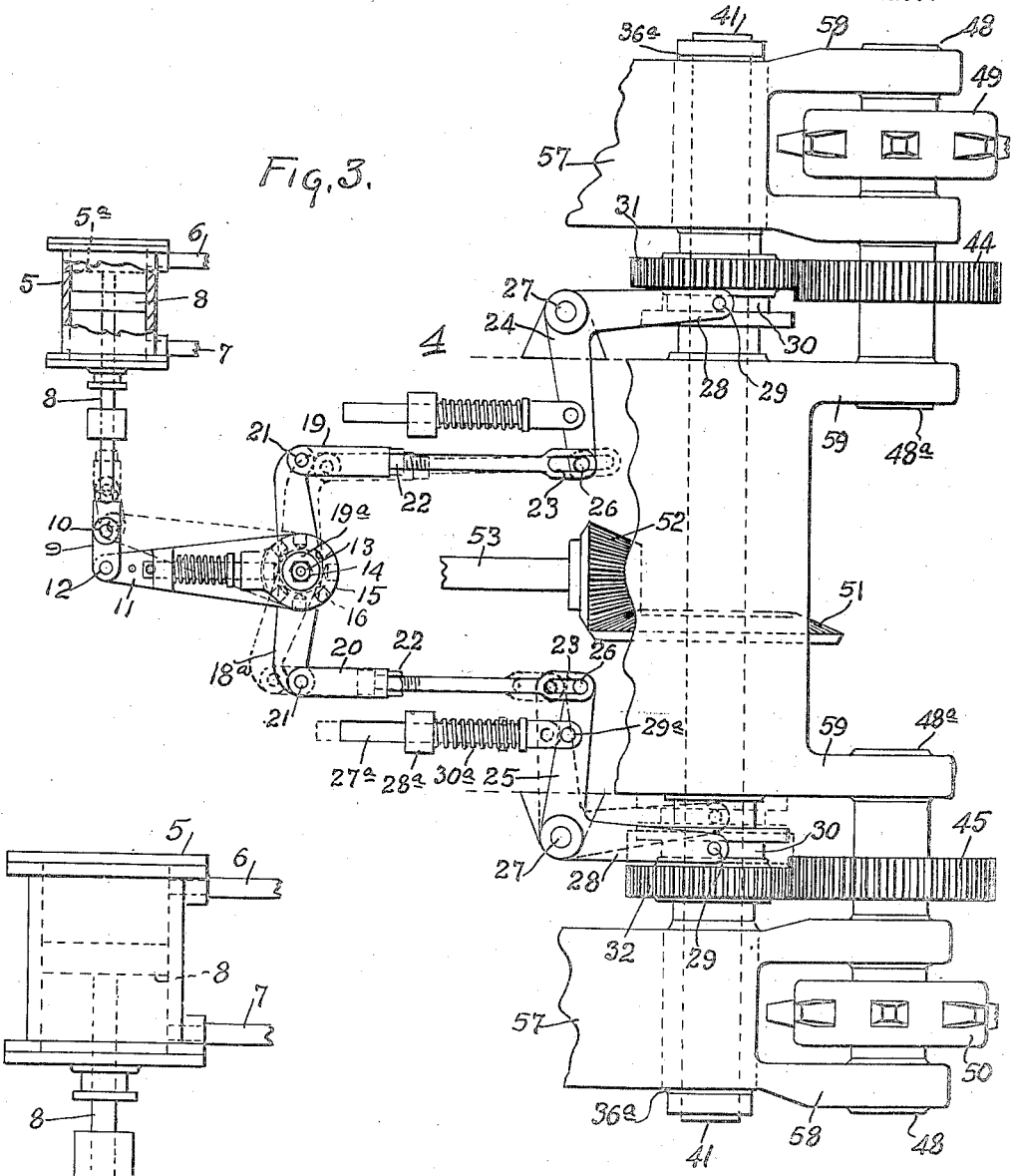
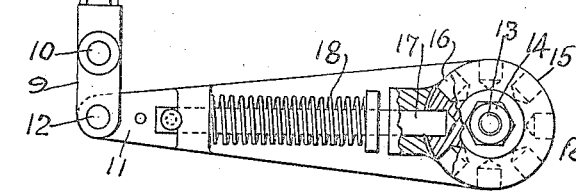

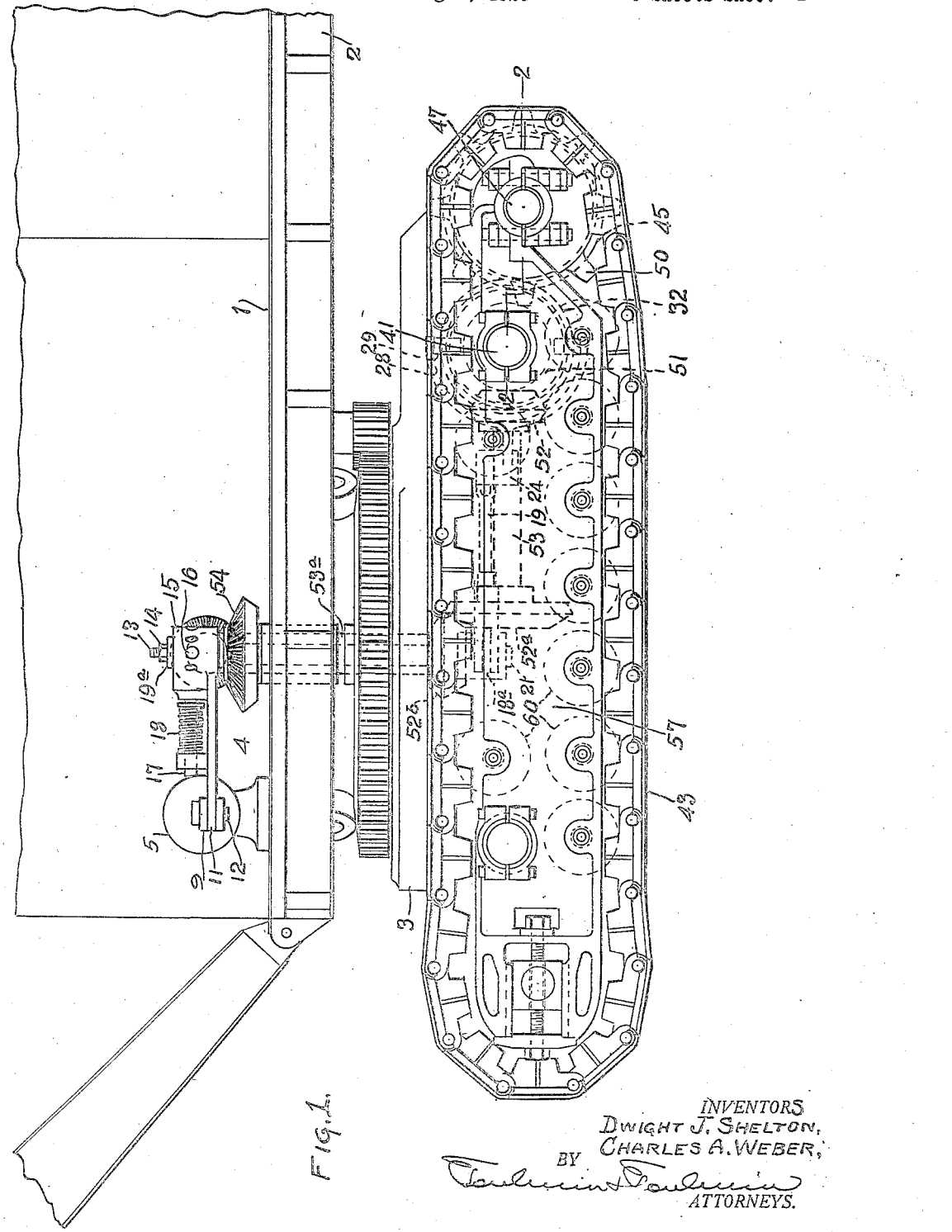

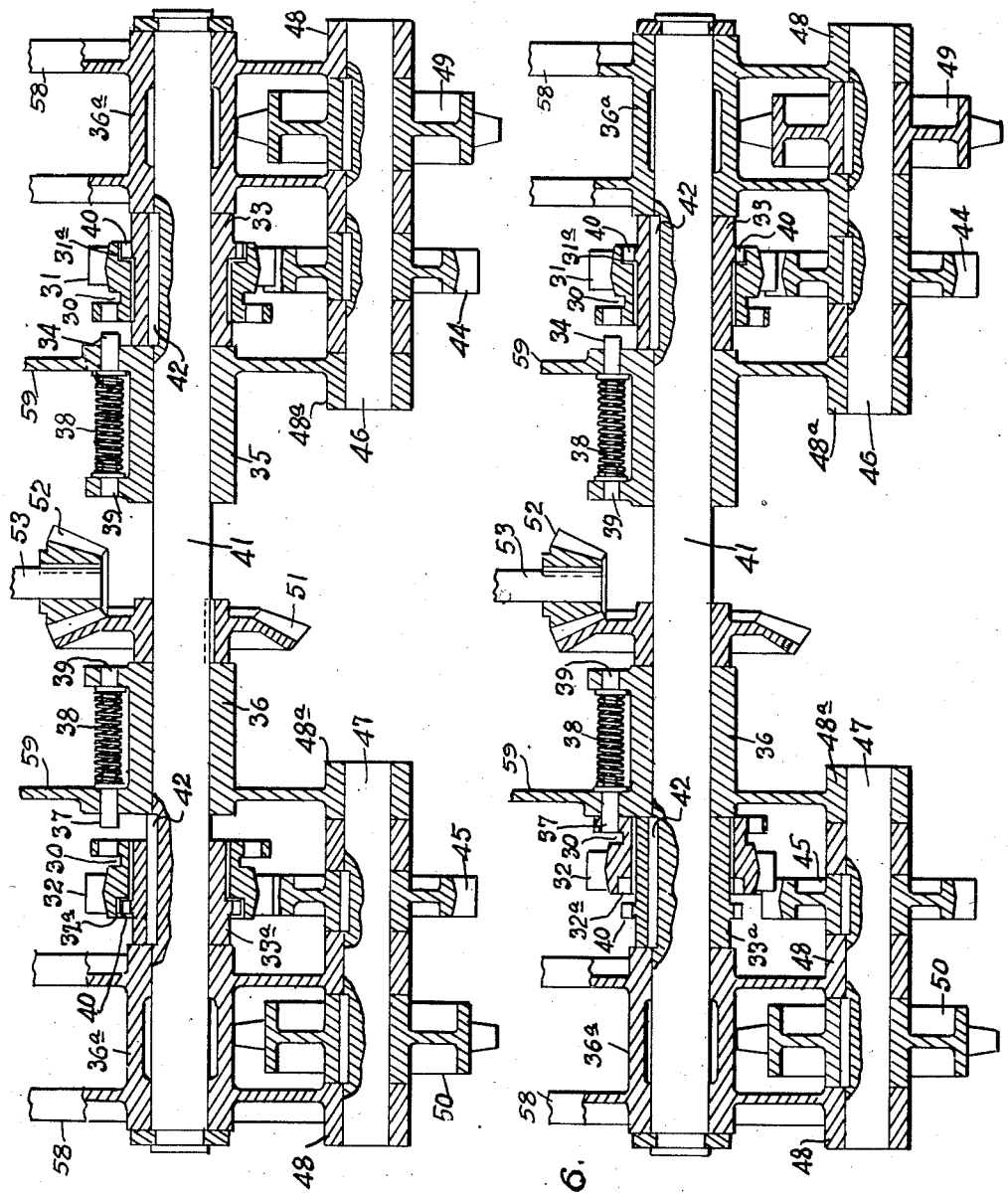

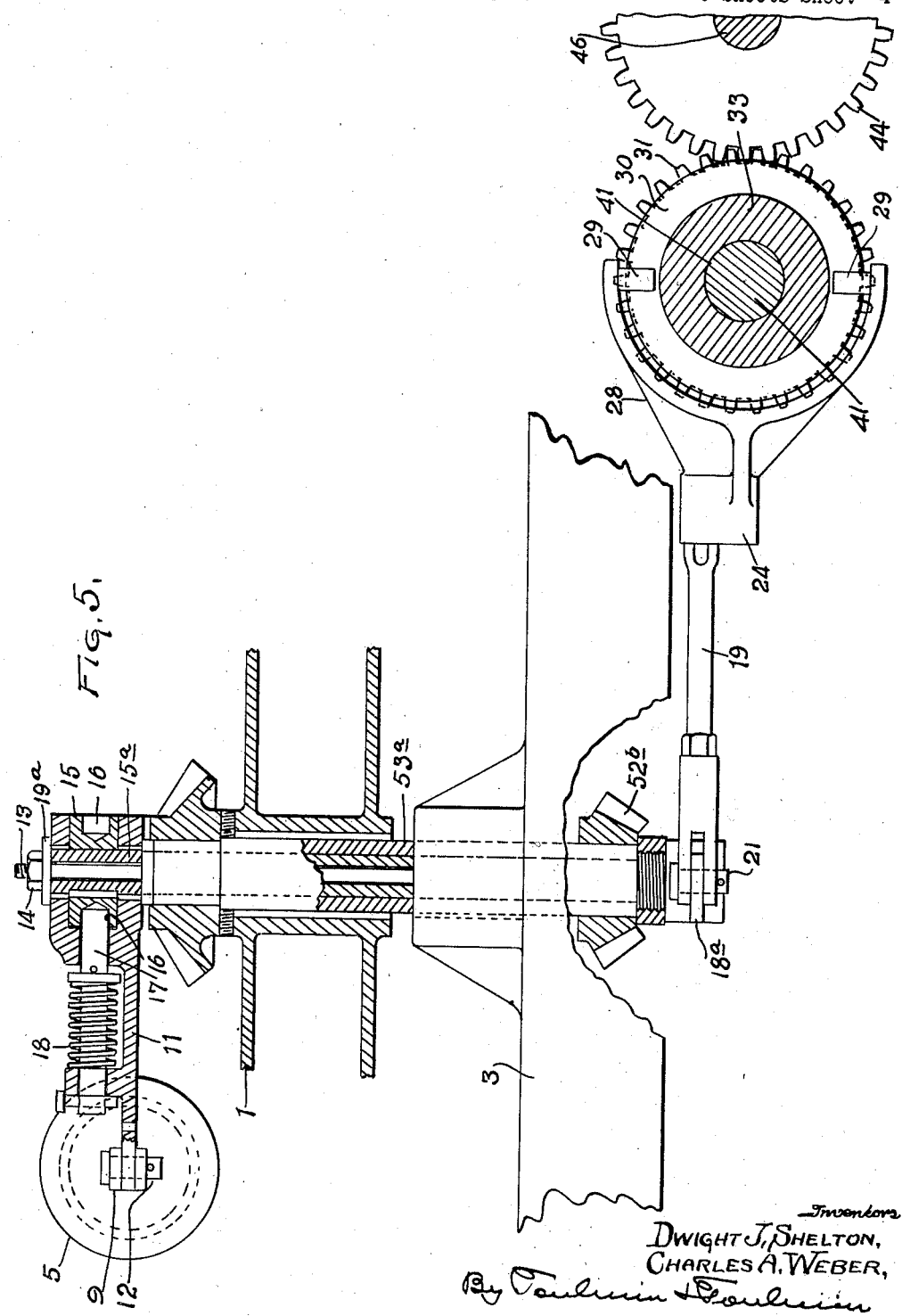

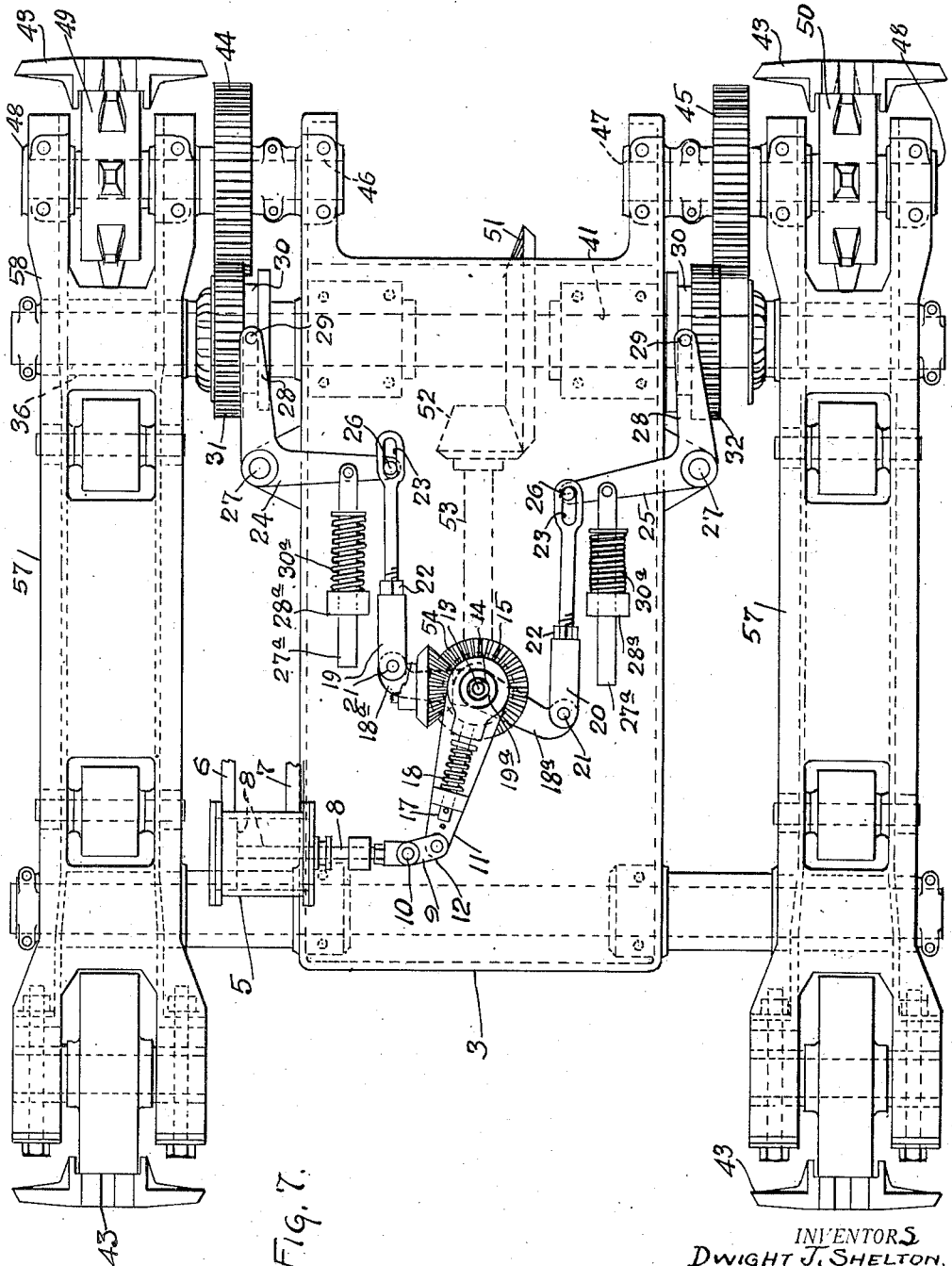

Patented Feb. 12, 1929.

1,701,594

UNITED STATES PATENT OFFICE.

DWIGHT J. SHELTON AND CHARLES A. WEBER, OF MARION, OHIO, ASSIGNORS TO THE MARION STEAM SHOVEL COMPANY, OF MARION, OHIO, A CORPORATION OF OHIO.

STEERING MECHANISM FOR POWER SHOVELS OF THE TRACTION-BELT TYPE.

Application filed August 5, 1926. Serial No. 127,310.

This invention relates to steering mechanism for power shovels of the traction belt type, meaning steam shovels which are mounted on endless traction-belts.

The object of our invention, generally stated, is to provide a type of steering mechanism mounted in part on the rotatable platform of the machine, and in part on the caterpillar or truck frame of the machine, the first branch of this mechanism, that on the rotatable platform being operable by a special motor, and the second branch of the mechanism, that mounted on the truck frame being operable by the first branch and fashioned and arranged to thereby lock the traction belt on one side against a traveling movement and to cause the traction belt on the other side to travel over the ground, whereby the apparatus may be steered to the right or to the left and may be turned around in either direction; or may be steered straight ahead by an intermediate positioning of certain parts of the mechanism in such wise that a traveling movement of the traction belts will be imparted to both of the belts at the same time. Such is the general object of our invention.

A further object is to provide an organization comprising a common shaft for driving the traction belts through a driving pinion and an intermeshing driven gear for actuating a sprocket wheel for each traction belt, this organization being characterized by the adjusting mechanism carried by the rotatable platform of the machine to cause one of such driving pinions to be unclutched from this common shaft and at the same time held non-rotative so as to lock against a traveling movement one of the traction belts while the other driving pinion will rotate with such common shaft and in turn give a traveling movement to the other traction belt.

A further object of our invention is the provision of such adjusting mechanism comprised of a power cylinder and piston, a yoke operable thereby, links connected to such yoke and spring-actuated bell crank levers having a sliding connection with such links and adapted as the result of an anti-clockwise movement around the axis of the yoke to lock one of the driving pinions while intermeshed with its driving gear of one traction belt, and by the same movement to maintain the other driving pinion in a rotative position on the shaft common to both pinions so as to rotate the intermeshing driving gear of the other traction belt; and by a clockwise movement of said yoke about its axis to reverse the positions of said driving pinions on the common shaft so that the traction belt which in the first adjustment was locked, will now be driven, while the traction belt which before was driven will now be locked; whereby to steer the machine in either direction.

Other objects of our invention will be developed and made manifest in the specification hereinafter to follow.

In the accompanying drawings forming a part of this specification and upon which like numerals indicate corresponding parts.

Figure 1 is a side elevation of so much of a steam shovel of the type in question as is necessary to illustrate the application of our steering mechanism.

Figure 2 is an enlarged detail view of the power driven shaft common to both traction belts and by which their sprocket wheels are rotated, the associated gearing and bearings being shown in section. This section is taken on the line 2—2 of Figure 1.

Figure 3 is a detail enlarged view of both branches of the mechanism, the actuating branch carried by the rotatable platform of the machine and the gearing branch carried by the truck of the machine.

Figure 4 is an enlarged detail view of the motor or steam engine cylinder and the arm connected thereto to actuate the yoke and the actuating branch of the mechanism.

Figure 5 is an enlarged detail view, partly in section and partly in elevation, of the upper branch of the actuating mechanism carried by the general platform of the machine and of the lower branch as supported by the traction truck.

Figure 6 is a similar view to Figure 2, but with the parts adjusted to cause one traction belt to remain stationary while the other travels in order to turn the machine.

Figure 7 is a like view to Figure 3 except that the parts are in the position they occupy when one traction belt is being held stationary and the other is being made to travel so as to turn the machine to one side or entirely around.

In Figure 1 is shown so much of a steam shovel, comprising generally a rotatable platform indicated at 1, mounted on a framing 2, and a truck frame indicated generally at 3, as is necessary to illustrate the present invention.

The steering mechanism comprising this invention is divided into two branches. One we term the actuating branch, which is suitably mounted on the rotatable platform 1, is generally indicated in Figures 1 and 5. The other branch of this steering mechanism, which we term the actuated branch, generally indicated at 4, is mounted on the truck frame.

Referring to the first or actuating branch it will be seen that it comprises a motor, preferably in the nature of a small steam engine designated at 5, with the usual steam inlet pipe and exhaust pipe 6 and 7, and having the usual piston and piston rod 8. This rod by means of a link 9 pivoted to the rod at 10 is designed to oscillate an arm 11 to which the link is pivoted at 12. The arm 11 is mounted rotatably on a shaft 13 having a nut 14 to maintain the arm and a disk 15 thereon. This disk is rigidly secured to the shaft 13 and is provided with a series of recesses 16 adapted to receive a lock pin 17 slidingly mounted on the arm and having a spring 18 which acts to maintain the pin in whichever of the recesses 16 it may be desired to insert it. When the piston is reciprocated the arm 11 is oscillated and this in turn rocks the shaft 13 to which is also rigidly secured a yoke 18$^a$, as best seen in Figure 3. The reciprocation of the engine piston rocks the arm 11 either anticlockwise, to the left as viewed in Figure 3, or clockwise, to the right as viewed in that figure, which in turn likewise rocks the yoke 18$^a$. Attached to the yoke are links 19 and 20 each pivoted thereto as at 21 and each having a nut 22 adapted by a thread to properly adjust the length of the links. The other extremity of the links is slotted as shown at 23 so as to make a sliding connection between the links and the bell crank levers 24 and 25 each of which has a wrist pin 26 adapted to permit the links to move freely thereon in one direction and to stop the links in the other so as to actuate the respective bell crank levers on the movement of the links respectively. These levers are pivoted at 27, on a pivot suitably supported by the machine and are positioned to keep their wrist pins in one extremity of the slot 23 by spring devices consisting of rods 27$^a$ carried by bearings 28$^a$ and pivoted at 29$^a$ to the links, with springs 30$^a$ to position the bell crank levers; the levers 24 and 25 at their other ends being bifurcated as shown at 28 in Figure 5 and having projections 29 which enter grooves 30 in the hub of pinions 31 and 32 as more clearly seen in Figure 2.

Therefore, when the bell crank levers are actuated they serve to adjust the pinions slidingly on the clutch sleeves 33 and 33$^a$, respectively, so as to position the pinions either as shown in Figures 2 and 3, in which position the machine would be steered straight ahead, or in the position shown in Figures 6 and 7, in which the pinion 32 is engaged with a locking pin 37 mounted in the bearing 36. There are two of these bearings—the other indicated at 35 with its locking pin 34. Each pin is urged to the position shown in Figure 2 by expanding springs 38. One end of each spring is carried by a stud 39 also mounted, respectively, in the bearings 35 and 36.

Each pinion, 31 and 32, is fashioned with recesses 31$^a$ and 32$^a$, respectively, adapted to receive projections 40 on the clutch sleeves 33 and 33$^a$ so as to clutch these pinions to these clutch sleeves when the parts are in the position shown in Figure 2 and to unclutch one of them when adjusted to the position indicated in Figures 6 and 7.

When both pinions are clutched to the clutch sleeves they will be rotated by the driven shaft 41 which is common to both clutch sleeves, which are keyed to this shaft as indicated at 42, in which case, as will presently appear, both traction belts, generally indicated at 43 in Figure 1, will be made to travel and advance the machine straight ahead. These pinions respectively mesh with spur gears 44 and 45, which are mounted on and keyed to sprocket shafts 46 and 47 respectively, these shafts being carried in suitable bearings generally indicated at 48 and 48$^a$ when the shafts 46 and 47 are mounted and keyed to the sprocket wheels respectively indicated at 49 and 50. When both pinions 31 and 32 are in the position shown in Figure 2, both sprocket wheels would be rotated, one on one side of the machine and the other on the other side, so that both traction belts 43 would be made to travel and steer the machine straight ahead as above stated. But when one pinion, the pinion 32 for instance, has been shifted laterally by the actuating mechanism above described and particularly shown in Figure 3, and made to engage with its pin 37, it will become locked against rotation. As the locked position of the pinion does not throw it out of mesh with the teeth of the spur gear 45, this gear will also be locked when the pinion is locked. The traction belt at that side of the machine will, therefore, be held stationary while the traction belt at the other side will be made to travel through the fact that the pinion 31 on that side is unlocked and is transmitting motion to the belt through the spur gear 44 and the sprocket wheel 49. This will cause the machine to travel forwardly but in a curved path at that side of it, while the other side, where the traction belt is then stationary, will not travel; and thus the machine will be turned either to one side or entirely around, as may be desired.

And it will be understood that either of these pinions 31 and 32 may be locked while the other will remain unlocked, so that the machine may be directed or turned in either direction, to the right or to the left.

We would further observe that as a part of the traction frame there are additional bearings 36ª for the shaft 41. This shaft is driven by a beveled gear wheel 51 keyed thereto and rotated by a beveled pinion 52 carried by a shaft 53 which extends longitudinally and is provided with a beveled gear 52ª which meshes with a beveled pinion 52ᵇ carried by a vertical shaft 53ª having at its upper end a beveled gear 54 designed to receive rotary motion from the propelling engine carried, in practice, on the swinging platform 1 of the machine. (See Figure 1.) The shaft 53ª is positioned centrally so that when the platform swings on the truck frame this shaft 53ª will be coincident with the center. The swinging of the platform on this center is effected by certain mechanism in this class of machines and, therefore, is not shown.

It will now be seen that our steering mechanism comprises two major branches, one we denominate the actuating branch being that part which is carried by the platform of the machine and is illustrated in detail in Figure 3, and the other part which we denominate the actuated branch, which is carried by the truck frame; and that the relation of these parts is such that the actuating branch will operate the other branch irrespective of the position the platform may occupy as its position has no reference to the operation of the steering mechanism in the sense that the steering mechanism is operable irrespective of the position of the platform with reference to the truck.

The truck frame is of the form and type usually employed by our assignee, The Marion Steam Shovel Company, in its manufacture of this type of steam shovels. In general, this frame is composed of a heavy body casting 3 and two side castings indicated at 57. (See Figures 1 and 3.) These side castings 57 include webs 58 which support the bearings 36ª and 48. The main casting 3 supports webs 59 which carry the bearings 35 and 36. The side castings 57 also carry a series of rollers indicated in dotted lines at 60 in Figure 1, which transmit the weight of the superstructure to the lower lap of the endless traction belts 43.

The mode of operation of the steering mechanism will be understood from the foregoing, but may be briefly summarized as follows:

When it is desired to direct the machine straight ahead, the parts of both branches, the actuating and the actuated branches of the steering mechanism, will be in the position shown in Figure 3, with the piston of the engine 5 substantially midway in the cylinder.

It will be observed that the bell cranks 24 and 25 and the pinions 31 and 32 are so positioned that both pinions are clutched to the clutch sleeves 33 and 33ª respectively and that both pinions are in mesh with the gears 44 and 45 respectively so that the two traction belts are being equally driven by their respective sprocket wheels 49 and 50, resulting in the machine traveling straight ahead. What is here stated is illustrated particularly in Figures 2 and 3.

Then referring to Figures 6 and 7, it will be seen that one of the pinions, pinion 32, is locked by engagement with its pin 37 and that, therefore, the gear 45 and sprocket wheel 50 will hold stationary while the other pinion 31 is clutched to the clutch 33 and, therefore, rotates with the shaft 41 and causes the belt at that side of the machine to travel. It will be noted from Figure 7 that when the parts are in this position, the piston is at one end, as shown in dotted lines at 5ª in Figures 3 and 7, instead of being at the middle of the cylinder 5, as shown in full lines in Figure 3, and that the arm 11 has been turned clockwise so as to throw the pinion 32 into locking engagement with its pin 37, and so as to cause the slot 23 to travel on pin 26 carried by the bell crank lever 24, so as to preserve pinion 31 in clutched relation to the clutch sleeve 33 whereby to drive the belt at that side. At the same time the link 20 will have pulled on the wrist pin 26 carried by the bell crank lever 25 to throw the pinion 32 into locking engagement with the pin 37 as above stated.

Referring back to Figure 5, it will be seen that the shaft 53ª is hollow and that the pinions 52ᵇ and 54 are mounted and secured on this hollow shaft, while the disk 15 and the arm 11 are mounted on an inner hollow shaft 15ª which extends down through the outer hollow shaft 53ª and carries the yoke 18ª at its lower end. A tie bolt 13 extends through the inner hollow shaft 15ª and at its lower end is suitably secured (in a manner not necessary to show because forming no part of this invention), whereby the nut 14 and washer 19ª carried thereby are made to hold the arm 11 in place on the inner hollow shaft 15ª, all as seen in Figure 5.

It will be understood that we desire to comprehend within our invention such modifications as may be necessary to adapt it to varying conditions and uses.

Having thus fully described our invention, what we claim as new and desire to secure by Letters Patent is:

1. In a machine of the character described, having a platform and a truck carrying conveying mechanism, the combination therewith of steering mechanism comprising an actuating branch composed of the motor and levers and intermediate connections between the piston of the motor and the levers, all carried by the platform but operable independent of the position of the platform, and of an actuated branch comprising a driven shaft pinion thereon controlled by said levers and conveying mechanism controlled by said pinions, one position of the levers and pinions causing the machine to advance straight ahead and another position thereof acting to lock the conveying mechanism at one side and to rotate it at the other side.

2. In a machine of the character described having a platform and a truck carrying conveying mechanism, the combination therewith of steering mechanism comprising an actuating branch carried by the platform operable independent of the position thereof, and consisting of an engine, an arm connected thereto, a yoke operable by the arm, links connected to the yoke and levers having a sliding connection with the links, and the actuated branch comprising a driven shaft having clutched sleeves, pinions adapted to be clutched and unclutched to said sleeves, locking devices to lock either pinion from rotating while the other pinion travels with its clutch and gearing connected with the conveying mechanism and in mesh with said pinions, whereby when both pinions are clutched the machine will go ahead and when one pinion is locked and the other clutched the machine will make a turning movement when advanced.

3. In a machine of the character described, the combination with an engine and piston, an arm actuated thereby, a shaft connected to the arm and a yoke to the shaft, solid links carried by the yoke and bell crank levers having a sliding connection with the links, and a driven shaft having clutched sleeves thereon operated by the bell crank lever, adjacent locking devices, pinions connected with the levers and adapted thereby to be positioned to engage with the clutches or be engaged with the locking devices, one pinion being clutched while the other is locked, or both pinions being clutched and unlocked according to their position.

4. In a machine of the character described, a steering mechanism comprising an actuating branch consisting of an engine, an arm operable thereby, a yoke connected to the arm, links connected to the yoke, bell crank levers slidingly connected with the links and spring devices to normally urge each lever in a fixed position with respect to the links so that the links may slide on their connection with the levers, whereby both levers may maintain a given position or one lever maintain one position and the other a different position; and comprising an actuated branch consisting of a driven shaft having clutches thereon engaged by the bell crank levers and associated locking devices, a pinion on each sleeve and operable by the levers to clutch both pinions to the clutches or to lock one pinion and maintain the other in the clutch, the sliding connection between the levers and links permitting of the latter function.

5. In a machine of the character described, a steering mechanism comprising two branches, one an actuating and the other an actuated branch, the former branch consisting of a steam engine, an arm oscillatable thereby, a yoke connected to the arm, a sliding link connected to each end of the yoke, a bell crank lever having a sliding connection with each link, and springs to urge the levers normally to one limit of their connection with the links, and the latter branch consisting of a driven shaft having clutched sleeves engaged by the bell crank levers, a pinion on each sleeve and adapted to be clutched and unclutched from the sleeve, and locking device adjacent the pinions and a connection between each pinion and one of the levers, whereby both pinions may be clutched at the same time or one pinion may be locked and the other clutched at the same time.

In testimony whereof, we affix our signatures.

DWIGHT J. SHELTON.
CHARLES A. WEBER.